US005313183A

United States Patent [19]

Kasahara

[11] Patent Number: 5,313,183

[45] Date of Patent: May 17, 1994

[54] GAS-TUBE ARRESTER

[75] Inventor: Masataka Kasahara, Nagano, Japan

[73] Assignee: Shinko Electric Industries Co., Inc., Nagano, Japan

[21] Appl. No.: 109,267

[22] Filed: Aug. 20, 1993

[30] Foreign Application Priority Data

Aug. 22, 1992 [JP] Japan ................................ 4-245786

[51] Int. Cl.[5] ........................ H01H 83/10; H02H 7/24

[52] U.S. Cl. ........................................ 337/32; 337/31; 361/124; 361/129

[58] Field of Search ........................ 337/28, 31, 32, 33, 337/34; 361/120, 124, 129, 130

[56] References Cited

U.S. PATENT DOCUMENTS 4,062,054 12/1977 Simokat ................................ 361/119
4,212,047 7/1990 Napiorkowski .................... 361/124

FOREIGN PATENT DOCUMENTS 2-003274 1/1990 Japan .
2-070390 5/1990 Japan .

*Primary Examiner*—Harold Broome

*Attorney, Agent, or Firm*—Staas & Halsey

[57] ABSTRACT

A gas-tube arrester includes an arrester body containing an inert gas and having first and second electrodes positioned in spaced, facing relationship to each other and separated by an insulator. An insulating, heat-resistant film is in contact with the first electrode and has an opening and a plurality of small holes. A metal plate layered on the insulating film has an opening communicating with the opening of the insulating film. A low-melting point metal plate layered on the metal plate to cover the openings has a melting point lower than a softening temperature of the insulating film. A conductive leaf spring is electrically connected to the second electrode and presses the low-melting point metal plate toward the metal plate, so that, when a high voltage is applied between the first and second electrodes, an electrical discharge occurs between the first and second electrodes through the small holes of the insulating films, and whereby when the low-melting point metal plate is fused by heat of the arrester body, the fused metal will flow through the openings to electrically connect the leaf spring to the first electrode.

15 Claims, 5 Drawing Sheets

GAS-TUBE ARRESTER

BACKGROUND OF THE INVENTION

1. Field of the Invention

The present invention relates to a gas-tube arrester, and more particularly, to a gas-tube arrester in which line electrodes and an earth electrode are positioned in spaced, facing relationship to and each other with insulators interposed therebetween.

2. Description of the Related Art

First of all, some examples of gas-tube arresters known in the prior art will be explained with reference to FIGS. 1 to 5.

An arrester 200 shown in FIG. 1 is mounted on a telephone line or other communication line to protect the communication equipment from lightning or other external electrical surge. For the arrester 200, as shown in FIG. 2, a gas-tight arrester body 220, in which argon or other inert gas is contained and line electrodes 206 and an earth electrode 208 are arranged with insulators 210 interposed therebetween, is often employed.

If a power supply cable line e.g., at 100, 200, or 6600 Volt. AC) is in contact with a telephone line repeatedly, a high voltage is repeatedly applied to the arrester body 220. Then, an electric discharge continues in the arrester body 220. Eventually, the arrester 200 may become overheated and cause a fire or other disaster.

As a precaution for preventing the arrester 200 from overheating, as shown in FIGS. 1 and 2, an insulating film 204 made of polyester or other thermoplastic resin is placed between the arrester body 220 and a conductive leaf spring 202, the latter attached on the outer circumferential surface of the arrester body 220. Thus, a fail-safe mechanism is implemented in the arrester 200.

Using the arrester 200 having this kind of fail-safe mechanism, when a high voltage is applied repeatedly and an electric discharge continues in the arrester body 220, the arrester 200 will then be overheated. Then, the insulating film 204 made of a thermoplastic resin is fused by the heat of the arrester body 220. Then, the conductive leaf spring 202 is urged into contact the line electrodes 206 and the earth electrode 208 and electrically connects the line electrodes 206 and earth electrode 208. Therefore, the earth electrode 208 and line electrodes 206 are electrically shorted. This stops the consecutive electric discharge in the arrester body 220. Consequently, a fire resulting from the overheated arrester 200 can be avoided.

However, in the arrester 200 having only such a fail-safe mechanism as shown in FIGS. 1 and 2, if the argon or other inert gas contained in the arrester body 220 leaks for some reason, even if an external surge is applied to the arrester 200, an electric discharge cannot occur in the arrester body 220. This may damage the communication equipment or other unit of a communication system.

To cope with the foregoing drawback, Japanese Unexamined Patent Publication (Kokai) No. 53-52961 (U.S. Pat. No. 4,212,047) has proposed an arrester having both a vent-safe mechanism and a fail-safe mechanism as shown in FIG. 3.

In the arrester of FIG. 3, insulating films 204*a* and 204*b*, clamped between line electrodes 206 and a conductive leaf spring 202 which is electrically coupled to an earth electrode 208, have respective slits 212 and 212.

Owing to the slits 212, as shown in FIG. 4, a space, defined by the thickness of the insulating films 204*a* and 204*b*, is formed between the conductive leaf spring 202 and the line electrodes 206.

In the gas-tube arrester shown in FIGS. 3 and 4, a fail-safe mechanism and a vent-safe mechanism are implemented.

To be more specific, when an arrester body is heated due to consecutive electric discharges in the arrester body, a fail-safe mechanism operates. That is to say, the insulating films, made of a thermoplastic resin, fuse and a conductive leaf spring electrically connects the line electrodes and an earth electrode thereby to stop the consecutive electric discharges. This prevents the occurrence of a fire.

If argon or other inert gas contained in the arrester body leaks, a discharge cannot occur in the arrester body. In this case, if an external surge is applied to the arrester, the spaces formed by the slits 212 disposed at the tops of the line electrodes 206 (FIG. 4) induce an electric discharge between the line electrodes 206 and the conductive leaf spring 202. Thus, a vent-safe mechanism operates.

However, in the arrester shown in FIGS. 3 and 4, the temperature of the arrester body increases due to consecutive discharges. Even if the insulating films fuse to thereby bring the conductive leaf spring into contact with the line electrodes and thus the fail-safe mechanism operates, the contact resistance is still high because the conductive leaf spring and the line electrodes are brought into contact merely with the spring force of the conductive leaf spring.

A temperature cycle test was conducted in the range from −40° C. to +60° C. to test the gas-tube arresters of this kind, in which a conductive leaf spring comes into contact with line electrodes. However, in some samples of the arresters the contact between the conductive leaf spring and line electrodes could not be attained. As a result, it was found that a fail-safe function, which is based on a permanent contact, could not be guaranteed.

In an effort to guarantee the fail-safe function, the present inventor has tested the arrester shown in FIG. 5 which has been proposed in Japanese Unexamined Patent Publication (Kokai) NO. 53-52960 (U.S. Pat. No. 4,062,054).

In the arrester shown in FIG. 5, insulating films 205*a* and 205*b* having heat resistance (insulating film 205*b* is not shown) are used instead of the insulating films 204*a* and 204*b* shown in FIG. 3, and a solder plate 211 for shielding a slit 212 is placed between each of the insulating films 205*a* and 205*b*, and a conductive leaf spring 202.

The fail-safe mechanism of the foregoing arrester operates in such a manner than, when the solder plates 211 are fused by heat developed in the arrester 220, the fused solder forms a connection between each of line electrodes 206 and the conductive leaf spring 202. This connection is achieved reliably by the fused solder. Therefore, the function of the fail-safe mechanism can make a reliable connection.

However, in the arrester shown in FIG. 5, the soft solder plates 211 are always pressed by the conductive leaf spring 202. Therefore, portions of the solder plates 202 that are shielding the slits 212 warp gradually toward the line electrodes 206. The solder plates 211 and line electrodes 206 may come into contact unexpectedly. Thus, the arrester cannot assure total reliability.

SUMMARY OF THE INVENTION

The object of the present invention is to provide an arrester capable of guaranteeing a fail-safe function and eliminating the possibility of an unexpected contact thus providing total reliability.

The present inventor has searched for a solution for achieving the foregoing object. As a result, it has been found that, in FIG. 5, if a metallic plate having slits at positions for communicating with slits 212 of the insulating films 205*a* and 205*b* is inserted between heat-resisting insulating films 205*a* and 205*b* and the solder plates 211, even when the solder plates 211 warp gradually toward the line electrodes 206, a sufficient space will remain between the line electrodes 206 and the conductive leaf spring. Consequently, dry contact of the leaf spring with the line electrodes 206 due to warped solder plates 211 can be prevented.

To be more specific, the present invention comprises an arrester body in which line electrodes and an earth electrode are positioned in spaced, facing relationship to each other with insulators interposed therebetween, insulating films abutting on the line electrodes having openings and being made of polyimide or other heat-resisting material, metal plates layered on the insulating films having openings and being made of copper or other heat-resisting metal, low-melting point metallic plates made of solder, tin, or other low-fusing point metal that fuses at a temperature lower than the decomposition or softening temperature of the heat-resisting material of the insulating films, and a conductive blade spring electrically coupled to the earth electrode and pressing the low-melting point metallic plates to the heat-resisting metallic plates so as to shield the openings of the heat-resisting metallic plates. Communicating holes each made up of a pair of openings bored in each of the insulating films and each of the metal plates are provided so that when the low-fusing point metallic plates are fused with heat of the arrester body, fused low-melting point metal flows in to electrically couple the conductive blade spring and line electrodes.

In the present invention having the foregoing construction, the arrester contains gas. In each of the insulating films, a ring of a plurality of small holes is formed in a portion that is in contact with each of the heat-resisting metallic plates. Thus, a fail-safe mechanism and a vent-safe mechanism are implemented.

A small hole is bored in each of portions of the low-melting point metallic plates that are shielding the openings of the metal plates. Therefore, when fused low-melting point metal flows into communicating holes, air in the communicating holes can be evacuated through the small hole. This smooths the inflow of the fused low-melting point metal to the communication holes.

According to the present invention, the openings bored in heat-resisting insulating films and heat-resisting metallic plates communicate. Spaces formed between low-melting point metallic plates and line electrodes are larger than those in a conventional arrester using insulating films alone. Therefore, even when the low-melting point metallic plates warp due to pressure of the conductive blade spring, the low-melting point metallic plates and line electrodes will not come into contact.

When consecutive discharges occur, if the arrester is overheated, the low-melting point metallic plates fuse to reliably connect the line electrodes and conductive blade spring. Consequently, the earth electrode and the line electrodes are connected permanently.

As a result, the arrester according to the present invention can guarantee a fail-safe function and provide high reliability.

DESCRIPTION OF THE PREFERRED EMBODIMENTS

The preferred embodiments of the present invention will now be described in detail with reference to the accompanying drawings.

Figure 6:
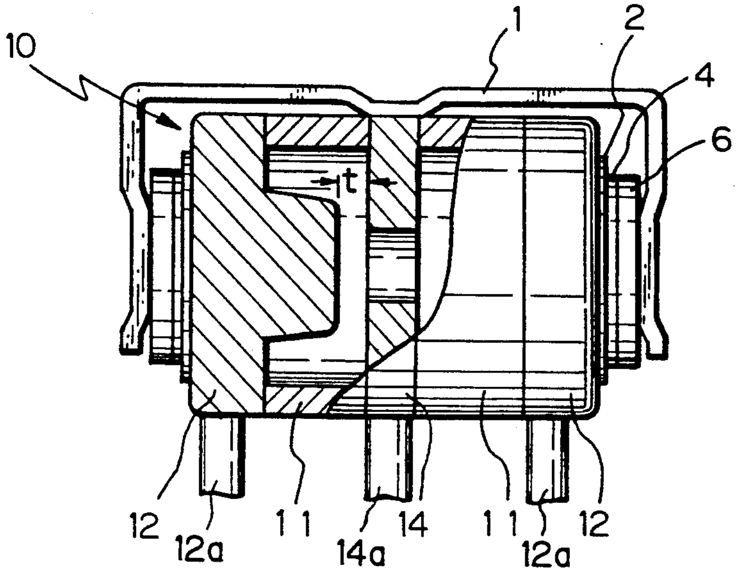
FIG. 6 is a partially cross-sectional, front view of a gas-tube arrester of an embodiment of the present invention.

FIG. 6 is a partially cross-sectional, front view of a gas-tube arrester according to the present invention. In an arrester body 10 in which a pair of line electrodes 12, 12 and a central earth electrode 14 are symmetrically arranged with a pair of insulators 11, 11, respectively, interposed therebetween. The line electrodes 12 extend into the arrester body 10.

The line electrodes 12, 12 and the earth electrode 14 can be connected to a telephone line (not shown) and the ground by means of leads 12*a* and 14*a*, respectively. In the gas tight arrester body 10, argon or any other inert gas is contained. If a high voltage is applied between the line electrodes 12 and the earth electrode 14, an electrical discharge will take place in gaps t (t=0.5 mm to 1.0 mm) therebetween.

To each of the line electrodes 12, 12 on the sides ends of the arrester body 10, an insulating film 2 made of a polyimide resin or a heat-resisting resin, a metal plate 4 made of copper, and a low-melting point metallic plate 6 made of solder and containing silver are attached and clamped by the end of a substantially U-shaped conductive leaf spring 1.

The leaf spring 1 is made of phosphor bronze or stainless steel. The center of the leaf spring 1 is spot-welded to the earth electrode 14. Thus, the leaf spring 1 is firmly secured to the arrester body 10.

Figure 7:
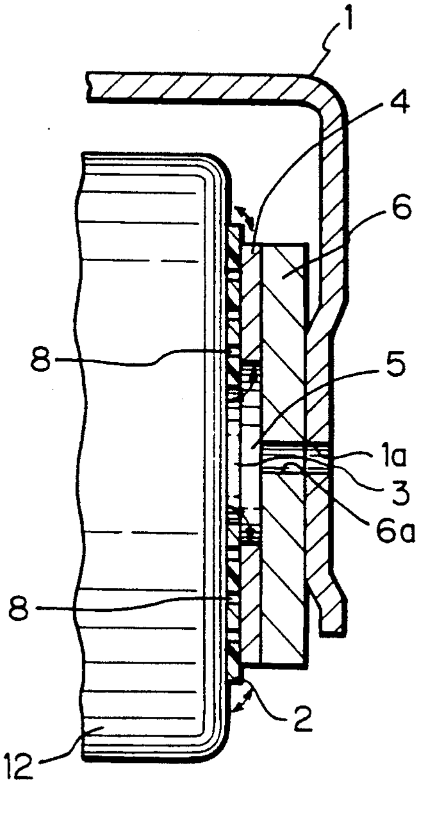
FIG. 7 is an enlarged cross-sectional diagram showing and end portion of the arrester shown in FIG. 6.

FIG. 7 shows a cross-section of a laminate section made up of the insulating film 2, a heat-resisting metallic plate 4, and a low-melting point metallic plate 6, which are layered on each of the ends of the arrester body 10.

Figure 8:
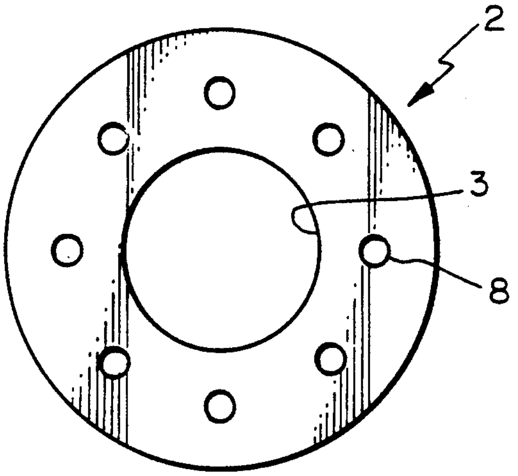
FIG. 8 is a plan view of an insulating film.
Figure 9:
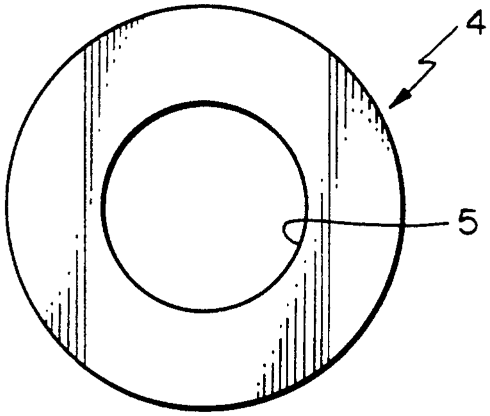
FIG. 9 is a plan view of a heat-resisting metallic plate.

As shown in FIGS. 8 and 9 circular openings 3 and 5 are bored in the centers of the insulating film 2 and metal plate 4, respectively. The insulating film 2 and heat-resisting metallic plate 4 are arranged so that the openings 3 and 5 communicate with each other. The opening 5 of the metal plate 4 is shielded with a low-melting point metallic plate 6 which is pressed by the leaf spring 1.

Therefore, a space having a total thickness equal to the insulating film 2 and the metal plate 4 is formed as an air gap for a fail-safe mechanism between the low-point metallic plate 6 and the line electrode 12.

Preferably, the total thickness of the insulating film 2 and metal plate 4 should range from 100 to 1,000 μm. If the total thickness is less than 100 μm, the space between a warped low-melting point metallic plate 6, occurring due to pressure of the leaf spring 1, and the line electrode 12 becomes too small. On the other hand, when the total thickness exceeds 1,000 μm, the space will be so large that the fail-safe function tends to fail.

In this embodiment, in order to reduce warp of the low-melting point metallic plate 6 due to pressure concentrated on the portion of the low-melting point metallic plate 6 that is shielding the opening 5 of the metal plate 4, the leaf spring 1 is arranged so that the portion of the low-melting point metallic plate 6 on which the pressing section of the blade spring 1 abuts and presses will cover both the opening 5 of the metal plate 4 and the circumference of the opening 5.

When the arrester of this embodiment is overheated due to consecutive electric discharges occurring in the arrester body 10, the heat of the arrester body 10 is transferred to the low-melting point metallic plates 6 via the insulating films 2 and metal plates 4, then fuses the low-melting point metallic plates 6.

Fused low-melting point metal flows into the communication holes or openings 3 and 5, bored in each of the insulating films 2 and each of the metal plates 4, respectively, owing to the pressing force of the leaf spring 1, thus reliably connecting the leaf spring 1 and line electrodes 12 to each other. In addition, redundant fused low-melting point metal that has oozed out from the communication holes flows out along the outer circumferences of the insulating films 2 and works as supplementary couplers for the line electrodes 12 and the leaf spring 1.

In this manner, the earth electrode 14 and line electrodes 12 are short-circuited to stop consecutive discharges in the arrester body 10. Thus, a fire resulting from overheating of the arrester body 10 can effectively be avoided.

Since at least one small hole 6*a* is bored in the portion of the low-melting point metallic plates 6 that is shielding the opening 5 of the metal plate 4, when the fused low-melting point metal flow into the communication holes or openings 3 and 5 bored in each of the insulating films 2 and each of the metal plates 4, respectively, air in the communication holes can be evacuated through the small hole 6*a*. This smooths the inflow of fused low-melting point metal into the communication holes. It is also preferable that the leaf spring 1 has a small hole 1*a* at a position corresponding to the small hole 6*a*.

The connections between the leaf spring 1 and line electrodes 12 remain firm by means of the low-melting point metal even when the arrester body 10 is cooled down after the consecutive discharges stop. The connections withstood a temperature cycle test conducted in the range of −40° C. to +60° C.

In this embodiment, a plurality of small holes 8 are formed on each of insulating films 2 abutting on the metal plates 4. The small holes 8 provide a vent-safe function. To be more specific, when argon gas or any other gas contained in the arrester body 10 leaks and an electric discharge cannot occur in the arrester body 10, if an external surge is applied to the arrester body 10, the spaces of the small holes 8 each having a diameter of about 0.2 mm to 0.4 mm induce an electric discharge between the metal plates 4 and the line electrodes 12.

It is, therefore, preferred that each of the insulating films 2 has a thickness of 50 to 99 μm ensuring the occurrence of electric discharges.

Furthermore, in this embodiment, each of the insulating films 2 has a larger diameter than each of metal plates 4, and each of openings 3 of the insulating films 2 has a smaller area (smaller diameter) than each of openings 5 of the metal plates 4. Therefore, the outer and inner circumferences of the metal plates 4 can be positioned inside those of the insulating films 2. Therefore, the metal plates 4 connected to a leaf spring 1 via low-melting point metallic plates 6 are separated from line electrodes 12 so that an electric discharge will not occur. Accordingly, an unstable state, in which electric discharge may occur between the outer or inner circumferences of the metal plates 4 and the line electrodes 12, is prevented.

In the gas-tube arrester of this embodiment, an electric discharge occurs only in the spaces of the small holes 8 arranged around the central opening 3. This helps stabilize a discharge start voltage and ensures a vent-safe function.

As described above, in the gas-tube arrester of this embodiment, sections serving as a vent-safe mechanism and a fail-safe mechanism are constituted separately as the small holes 8 and the low-melting point metal plates 6, respectively. Therefore, various means can be installed to exploit vent-safe and fail-safe functions constantly and reliably.

Figure 1:
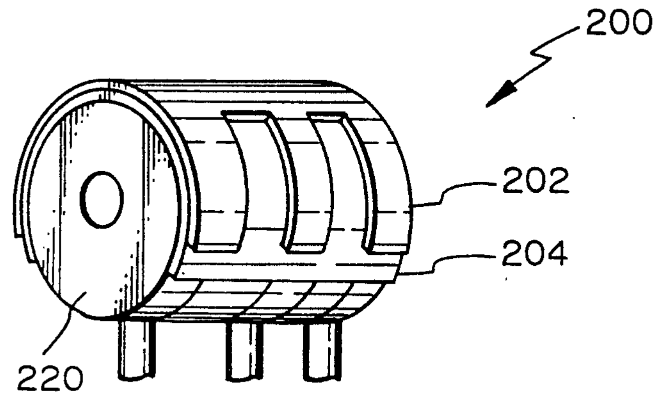
Fig. 1 PRIOR ART
FIG. 1 is a perspective view of a conventional gas-tube arrester.
Figure 2:
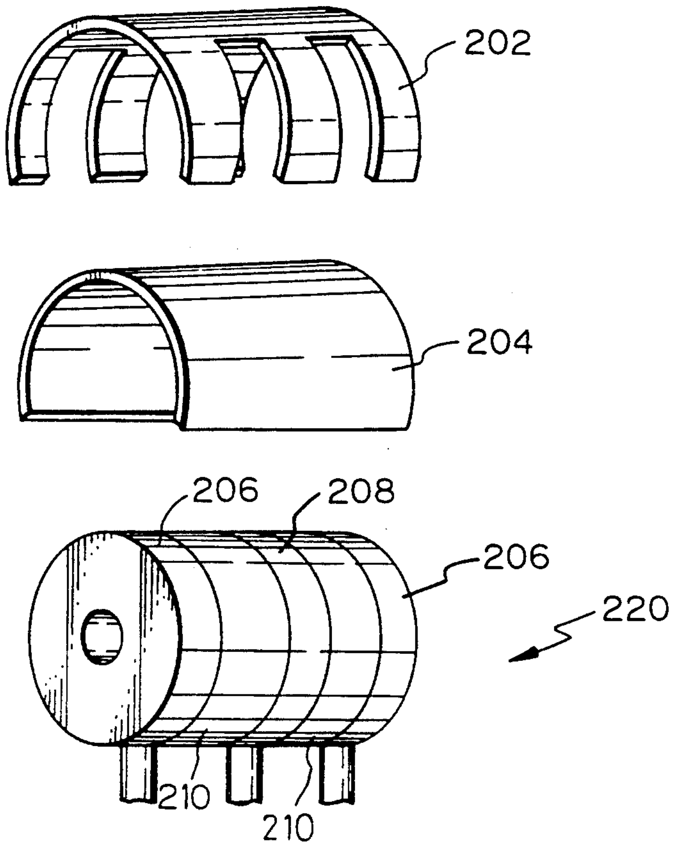
Fig. 2 PRIOR ART
FIG. 2 is an exploded view of the arrester shown in FIG. 1.
Figure 3:
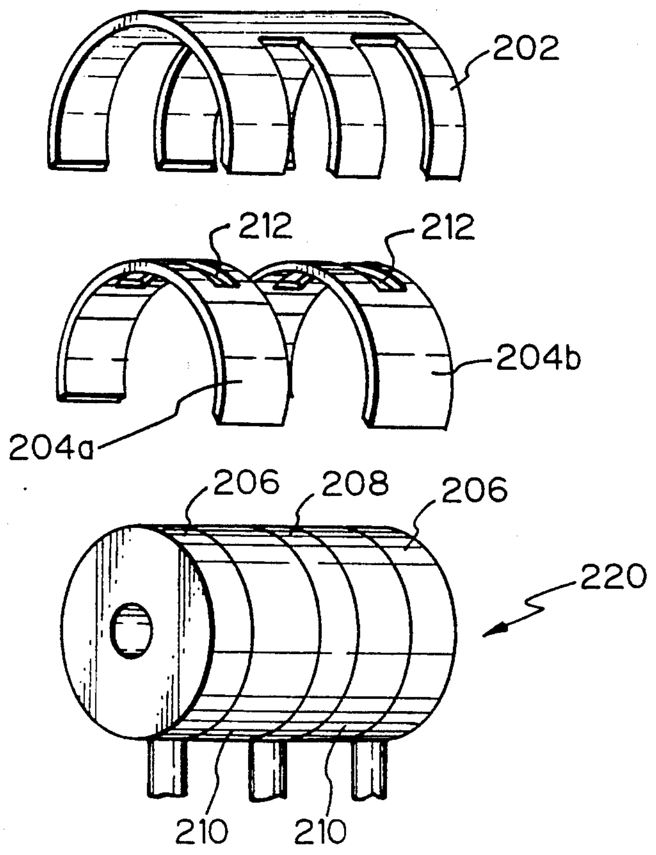
Fig. 3 PRIOR ART
FIG. 3 is an exploded view of a gas-tube arrester described in Japanese Unexamined Patent Publication (Kokai) No. 53-52960 (Specification in U.S. Pat. No. 4,062,054)
Figure 4:
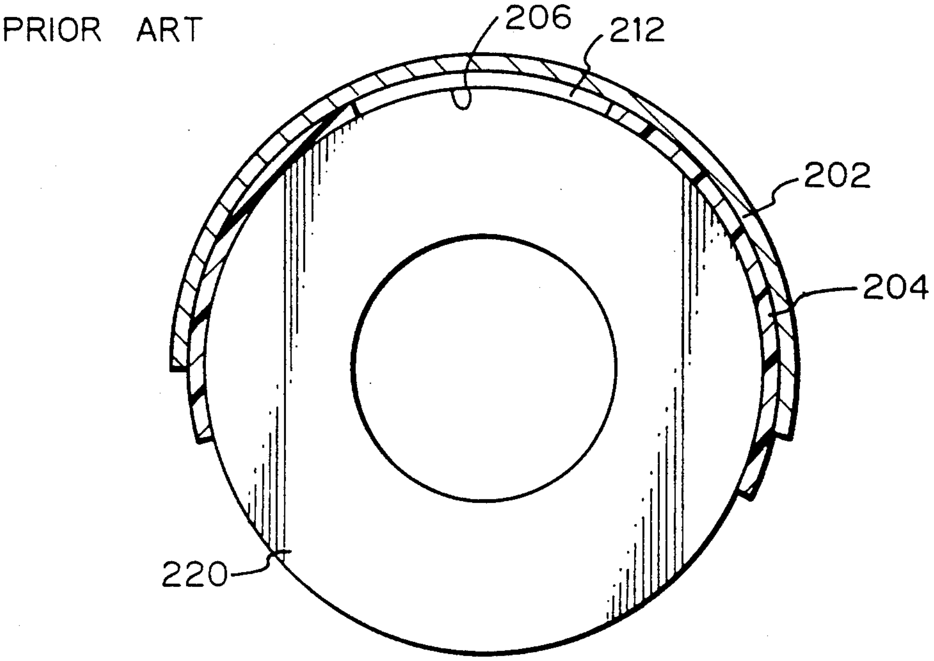
Fig. 4 PRIOR ART
FIG. 4 is a cross-sectional diagram of the arrester of FIG. 3.
Figure 5:
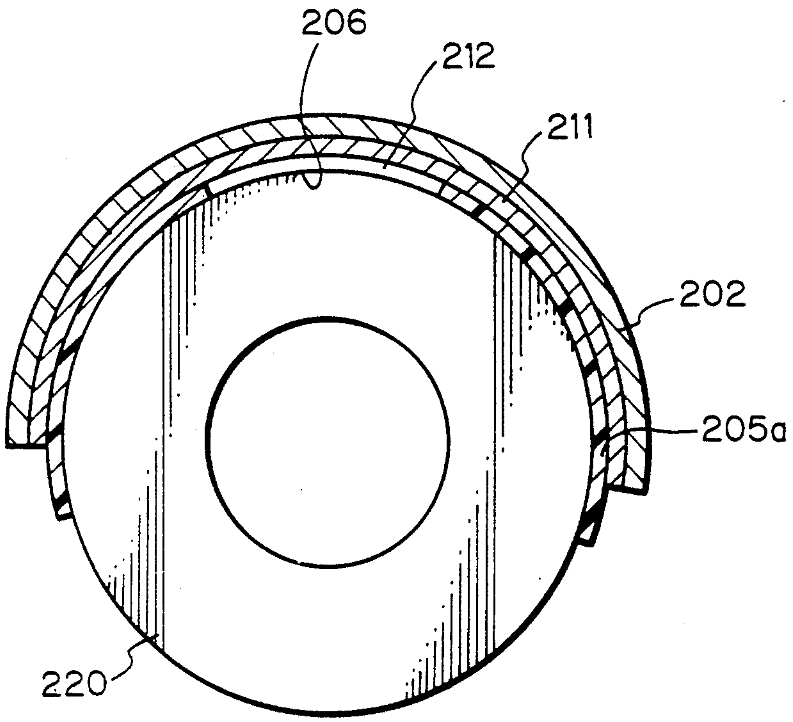
Fig. 5 PRIOR ART
FIG. 5 is a cross-sectional diagram showing a known gas-tube arrester described in Japanese Unexamined Patent Publication (Kokai) No. 53-52960 (Specification in U.S. Pat. No. 4,062,054)

In the arrester described above and shown in FIGS. 6 and 7, the insulating film 2, the metal plate 4, and the low-melting point metallic plate 6 are layered on each of the end planes of the arrester body 10. However, as shown in FIG. 3, the insulating film 2, the metal plate 4, and the melting point metallic plate 6 may be layered on each of the line electrodes by being formed over a cylindrical surface of the arrester body 10. In this case, as the metal plate 4, a metallic plate capable of being curved easily around the line electrodes should be used. Thus, the heat-resisting metallic plates can be in close contact with the insulating films curving along the line electrodes and, thereby, the air gaps providing fail-safe and vent-safe functions can be held constant. Thus ensures constant fail-safe and vent-safe functions.

As for the polyimide resin made into insulating films 2, an aromatic polyimide resin having a decomposition temperature of 400° C. and a thermal deformation temperature of 360° C. is preferred. Alternatively, any heat-resisting resin whose thermal deformation temperature is higher than that of the low-melting point metal plates 6 is suitable. Suitable resins include a polyamideimide resin, a polyetherimide resin or the like.

Other heat-resisting material suitable for the insulating films 2 include mica and other inorganic materials. Insulating films 2 made of an inorganic material are preferable, because they do not deform even at a very high temperature.

For the low-melting point metal plates 6, any low-melting point metals which fuse at temperatures lower than the thermal deformation temperature of insulating films 2 can be employed. Metals whose melting points range from 200° to 300+ C. are preferred. A preferable low-melting point metal is solder containing silver.

Figure 10:
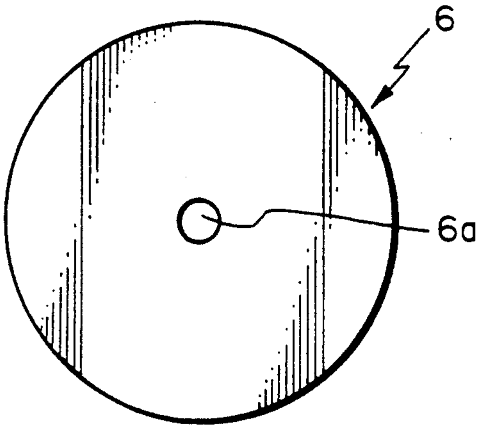
FIG. 10 is a plan view of a low-melting point metallic plate.

FIGS. 8, 9 and 10 are plan views of the ring-shaped insulating film 2, the ring-shaped metal plate 4 and the low-melting point metallic plate 6, respectively. The insulating film 2 has preferably a thickness of 50 μm, an outer diameter of 5 mm and an inner diameter of 3 mm, and also has a plurality of small vent holes 8 arranged around the central opening 3, each hole 8 having a diameter of 0.2–0.6 mm.

The metal plate 4 preferably has a thickness of 0.2 mm, an outer diameter of 4.8 mm and an inner diameter of 3.2 mm. The low-melting point metallic plate 6 preferably has a thickness of 0.3 to 0.4 mm and a diameter of 4.8 mm, and also preferably has a central hole 6a having a diameter of 0.3 to 0.4 mm.

According to the present invention as described above, a fail-safe function can be implemented reliably. This improves the reliability of a gas-tube arrester.

I claim:

1. A gas-tube arrester comprising:

an arrester body containing an inert gas and having first and second electrodes positioned in spaced, facing relationship to each other with an insulator therebetween;

an insulating, heat-resistant film in contact with said first electrode, said insulating film having an opening and a plurality of small holes arranged around said opening;

a first metal plate layered on said insulating film, said first metal plate having an opening communicating with said opening of said insulating film;

a second, low-melting point metal plate layered on said first metal plate to cover said openings, said second metal plate having a melting point lower than a softening temperature of said insulating film;

a conductive leaf spring electrically connected to said second electrode and pressing said second metal plate toward said first metal plate, so that, when a high voltage is applied between said first and second electrodes, an electrical discharge occurs between said first electrode and said first metal plate through said small holes of the insulating films, and whereby when said second metal plate is fused by heat of said arrester body, the fused metal thereof flows through said openings to electrically connect said leaf spring to said first electrode.

2. A gas-tube arrester as set forth in claim 1, wherein said first electrode is a line electrode and said second electrode is an earth electrode.

3. A gas-tube arrester as set forth in claim 1, wherein said insulating, heat-resistant film is comprised of a polyimide material.

4. A gas-tube arrester as set forth in claim 1, wherein said first metal plate is comprised of copper.

5. A gas-tube arrester as set forth in claim 1, wherein said second, low-melting point metal plate is comprised of solder or tin.

6. A gas-tube arrester as set forth in claim 1, wherein said second metal plate has a small opening at a position where said second metal plate covers said opening of said first metal plate.

7. A gas tube arrester as set forth in claim 1, wherein said insulating film has a larger diameter than said first metal plate and said opening of the insulating film has a smaller diameter than said opening of the first metal plate.

8. A gas-tube arrester comprising:

a cylindrical arrester body containing an inert gas and having a pair of first electrodes positioned at respective ends of said arrester body and a second, central electrode positioned between said first electrodes and separated therefrom by a pair of insulators;

a ring-shaped insulating, heat-resistant film in contact with each of said first electrodes, each of said insulating films having a central opening and a plurality of small holes arranged around said central opening;

a first ring-shaped, metal plate layered on each of said insulating films, each of said first metal plates having a central opening communicating with said central opening of said insulating film;

a second low-melting point metal plate layered on each of said first metal plates to cover said openings, each of said second metal plates having a melting point lower than a softening temperature of said insulating films;

a substantially U-shaped conductive leaf spring electrically connected to said second electrode and pressing said second metal plates inwardly to said first metal plates whereby when a high voltage is applied between said first and second electrodes, an electrical discharge occurs between said first electrodes and said first metal plates through said small holes of the insulating films, and whereby when said second metal plate is fused by heat of said arrester body, the fused metal thereof will flow through said openings to electrically couple said leaf spring to said first electrodes.

9. A gas-tube arrester as set forth in claim 8, wherein said first electrodes are line electrodes and said second electrode is an earth electrode.

10. A gas-tube arrester as set forth in claim 8, wherein each of said insulating, heat-resistant films is comprised of a polyimide material.

11. A gas-tube arrester as set forth in claim 8, wherein each of said first, metal plates is comprised of copper.

12. A gas-tube arrester as set forth in claim 8, wherein each of said second, low-melting point metal plates is comprised of solder or tin.

13. A gas-tube arrester as set forth in claim 8, wherein each of said second metal plates has a small opening at a position where said second metal plate covers said opening of said first metal plate.

14. A gas-tube arrester as set forth in claim 13, wherein said U-shaped conductive leaf spring has a pair of small openings corresponding to said small openings of said second metal plates.

15. A gas tube arrester as set forth in claim 8, wherein each said insulating film has a larger diameter than each said first metal plate and said opening of each insulating film has a smaller diameter than said opening of each first metal plate.

* * * * *

UNITED STATES PATENT AND TRADEMARK OFFICE
CERTIFICATE OF CORRECTION

PATENT NO. : 5,313,183

DATED : May 17, 1994

INVENTOR(S) : Masataka KASAHARA

It is certified that error appears in the above-identified patent and that said Letters Patent is hereby corrected as shown below:

Column 1, line 9, change "and each other" to --each other and--;

line 42, change "contact the" to --contact with the--.

Column 3, line 16, change "dry" to --any--.

Column 4, line 51, delete "sides".

Column 5, line 8, change "low point" to --low-melting point--;

UNITED STATES PATENT AND TRADEMARK OFFICE

CERTIFICATE OF CORRECTION

PATENT NO. : 5,313,183

DATED : May 17, 1994

INVENTOR(S) : Masataka KASAHARA

It is certified that error appears in the above-identified patent and that said Letters Patent is hereby corrected as shown below:

Column 6, line 14, change "area (smaller diameter)" to --diameter--;

line 58, change "Suitable resins" to --Suitable heat-resisting resins--.

Signed and Sealed this

Twenty-seventh Day of September, 1994

Attest:

Bruce Lehman

BRUCE LEHMAN

*Attesting Officer*

*Commissioner of Patents and Trademarks*